United States Patent [19]

Saito et al.

[11] Patent Number: 4,637,594
[45] Date of Patent: Jan. 20, 1987

[54] LEAF SPRING CONSTRUCTION

[75] Inventors: Tsutomu Saito, Chiba; Yoshimichi Hasegawa, Aichi; Kazuo Yoshikawa, Aichi; Shigetsune Aoyama, Aichi, all of Japan

[73] Assignees: Horikiri Spring Mfg. Co., Ltd.; Aichi Steel Works, Ltd.; Kabushiki Kaisha Toyota Chuo Kenkyusho, all of Japan

[21] Appl. No.: 437,394

[22] Filed: Oct. 28, 1982

[30] Foreign Application Priority Data

Oct. 29, 1981 [JP]   Japan ................................ 56-174051

[51] Int. Cl.$^4$ ............................................. F16F 1/18
[52] U.S. Cl. ...................................... 267/47; 267/158
[58] Field of Search ............... 267/7, 36 R, 40, 41, 267/44, 45, 47, 158, 160, 164

[56] References Cited

U.S. PATENT DOCUMENTS

| 285,324 | 9/1883 | Vose | 267/47 |
| 314,919 | 3/1885 | Davison | 267/47 |
| 598,516 | 2/1898 | Hess | 267/47 |
| 1,199,038 | 9/1916 | Landau | 267/47 |
| 1,730,700 | 10/1929 | Wallace | 267/47 |
| 3,053,527 | 9/1962 | Hallam | 267/47 |
| 3,585,086 | 6/1971 | Hrusovsky | 267/47 |
| 3,921,965 | 11/1975 | Skerry | 267/47 |
| 3,975,005 | 8/1976 | Duchemin | 267/47 |
| 4,512,559 | 4/1985 | Aoyama et al. | 267/47 |

FOREIGN PATENT DOCUMENTS

| 654806 | 12/1962 | Canada | 267/47 |
| 817765 | 10/1951 | Fed. Rep. of Germany | 267/47 |
| 56-167938 | 12/1981 | Japan | 267/47 |
| 57-9339 | 1/1982 | Japan | 267/47 |
| 7008 | of 1909 | United Kingdom | 267/47 |
| 2056015A | 3/1981 | United Kingdom | 267/47 |

*Primary Examiner*—Douglas C. Butler
*Assistant Examiner*—Richard R. Diefendorf
*Attorney, Agent, or Firm*—Sughrue, Mion, Zinn, Macpeak and Seas

[57] ABSTRACT

A leaf spring construction employs tapered leaf elements made from a steel sheet, where at least the tapered portion of the leaf elements have an arcuate shape in transverse cross-section with a convex surface on the tension side and a concave surface on the compression side thereof.

13 Claims, 19 Drawing Figures

LEAF SPRING CONSTRUCTION

BACKGROUND OF THE INVENTION

1. Field of the Invention

This invention relates to improvements in and relating to a tapered leaf spring element for vehicle axle shaft suspensions, which has a reduced thickness towards opposite ends thereof, and to a laminated leaf spring comprising a plural number of such leaf spring elements.

2. Description of the Prior Art

Conventional leaf springs of this sort have a shape which is flat in a cross-section taken along a plane perpendicular to the lengths thereof so that, upon the exertion of a bending moment, concentrated stress occurs in corner edge portions of the loaded surface on the tension side, which can cause fatigue failure in these portions.

In the production of leaf springs for vehicle axle shaft suspensions, it has been the general practice to use ordinary flat rolled steel strips which have a substantially rectangular shape in a cross-section taken along a plane perpendicular to the longitudinal direction of the steel strip. In some cases there is employed a flat rolled steel strip of a trapezoidal shape, or a channel-like shape having a groove in the bottom surface in a cross-section taken along a plane perpendicular to the length of the steel strip. The reason that steel plates of the above-mentioned sectional shapes are used for the leaf spring resides in that the steel strip of such a sectional shape has a broader width on the tension side than on the compression side, in contrast with the steel strip of plain rectangular cross-section, so that the neutral axis of the sectional area is shifted toward the tension side under a bending load, thereby reducing the tension (increasing the compression) under a bending moment and increasing the amplitude of the bearable repeated bending moment per unit weight. For example, a laminated leaf spring comprising a number of leaf elements of the grooved or trapezoidal cross-sectional shape, which is widely used in vehicular suspensions, is subjected to a mean bending moment due to a static load as well as a variable amplitude bending moment due to a dynamic load. Improvements in the fatigue strength per unit weight of such springs have been attempted utilizing the fact that the fatigue strength is higher on the compression side of the beam than on the tension side under a mean bending moment due to a static load.

However, in contrast with the steel strip of simple rectangular cross-sectional shape, greater difficulties are involved in rolling a leaf element of a cross-sectional shape as shown in FIG. 2 or 3 within a prescribed tolerance, in addition to increases in the rolling cost. Further, leaf elements having conventional cross-sectional shapes are disadvantageous in that fatigue fracture is apt to occur at the corner edge portions of the transverse cross-sectional shape on the tension side where a concentration of stress takes place, exhibiting a fatigue strength about 20% lower than that of a round bar spring (a spring having round cross-sectional shape) which has no such critical edge portion.

In order to resolve these problems it has been proposed to provide a leaf spring element of a particular cross-sectional shape which is designed to lower the stress on the tension side as compared with that on the compression side, to preclude stress concentration at the corner edge portions.

U.S. patent application Ser. No. 256,784 filed on Apr. 23, 1981 continuation application Ser. No. 518,766 filed on Aug. 1, 1983 in which three of applicants are the same as in this application discloses a leaf spring element which has a circularly arcuate shape with a convex surface on the tension side and a concave surface on the compression side in a transverse cross-section, and in which the neutral axis is shifted toward the tension side to reduce the tensile stress under a bending moment.

However, as is clear from beam theory, the bending stress acting on the leaf spring varies along the length thereof, and the stress is smaller at a portion, farther from a center portion of unit length thereof where the stress is maximum. Since the arcuate cross-sectional shape of the proposed leaf spring is the same throughout the length thereof and the size of the cross-section is determined by the maximum bending stress, the thickness of the leaf spring becomes excessive at some portions thereof, causing the weight of the leaf spring to be excessively large.

On the other hand, a leaf spring whose width is constant and whose cross-sectional area varies along the length thereof with the thickness around the center portion being a maximum has been proposed, as shown in FIG. 1. With this leaf spring 1, the distribution of bending stress is made uniform throughout the length thereof. This leaf spring is also effective in weight reduction. That is, compared with a conventional leaf spring having the same cross-sectional area throughout its length, the leaf spring 1 allows a weight reduction of about 10 to 15% while maintaining the strength thereof and attaining uniform stress distribution.

However, since the cross-sectional shape of this spring is rectangular throughout its length, the fatique breakdown is still concentrated at edge portions 1b in the upper surface 1a. That is, compared with an edgeless rod spring of the same material, the fatigue strength of the leaf spring 1 is less by about 20%. Therefore, the leaf spring 1 does not satisfy all of the requirements as to bending stiffness per unit weight, fatigue strength per unit weight and total weight reduction.

SUMMARY OF THE INVENTION

An object of the present invention is to provide a tapered leaf spring having substantially uniform bending stress throughout the length thereof, which is light in weight and has a high fatigue strength.

The above object is achieved according to the present invention by shaping the vertical cross-section of a spring such that it has a circularly arcuate shape with a convex surface on the tension side and a concave surface on the compression side in the traverse cross-section, such that the neutral axis is shifted toward the tension side to reduce the tensile stress under a bending moment to thereby improve the flexural rigidity and fatigue strength per unit weight, and such that the portion thereof to which the maximum bending stress is applied causing fatigue breakdown is shifted to an apex portion of the convex surface to eliminate the possibility of fatigue breakdown due to the presence of an edged corner portion.

Another object of the present invention is to obtain a satisfactory effect in the shot peening of the spring by causing the shot to collide with the apex portion of the convex surface at substantially right angles thereto.

BRIEF DESCRIPTION OF THE DRAWINGS

The above and other objects, features and attendant advantages of the present invention will become apparent from the following detailed description and appended claims, taken in conjunction with the accompanying drawings in which like reference characters designate like or corresponding parts through various figures, and wherein:

DETAILED DESCRIPTION OF THE PREFERRED EMBODIMENTS

Figure 1:
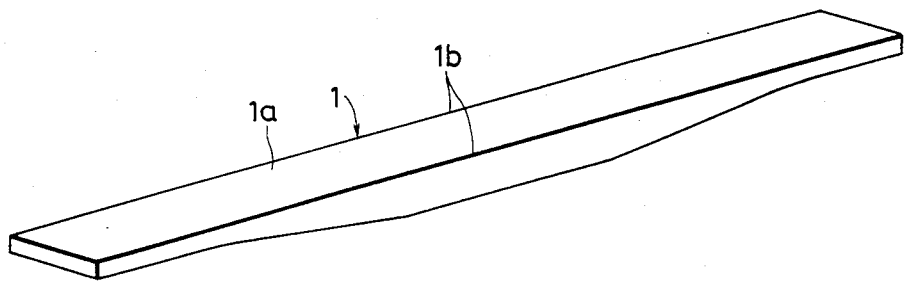
FIG. 1 is a perspective view of a conventional tapered flat leaf spring.
Figure 2:
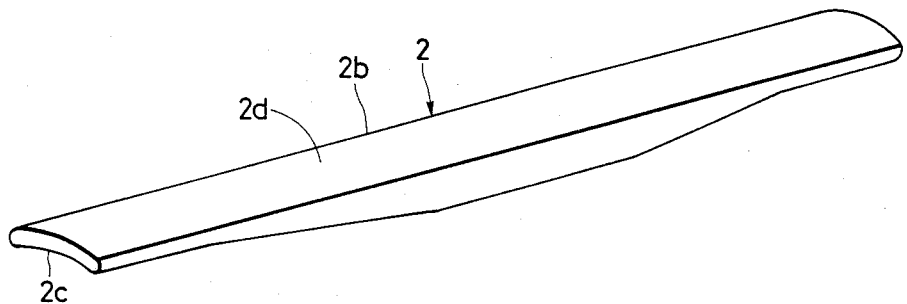
FIG. 2 is a perspective view of a leaf element illustrating a first embodiment according to the present invention.
Figure 3:
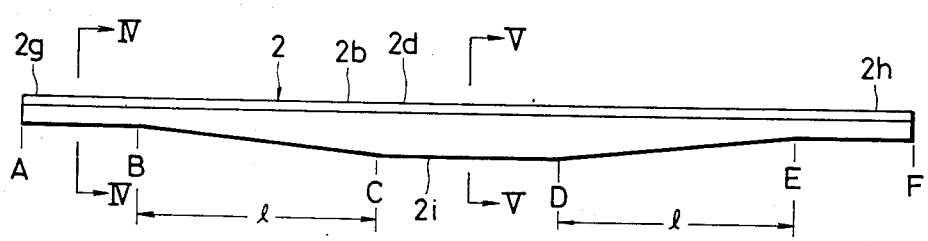
FIG. 3 is a side view showing a second embodiment of the present invention.
Figure 4:
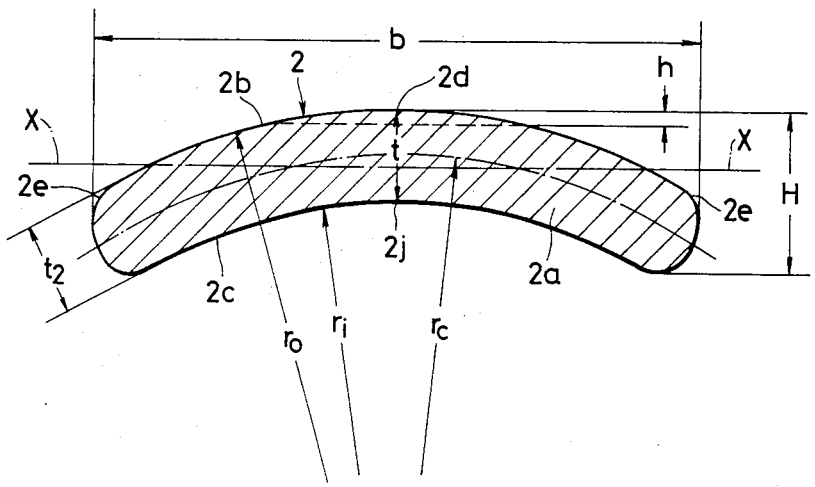
FIG. 4 is a cross-section taken along line IV—IV of FIG. 3.
Figure 5:
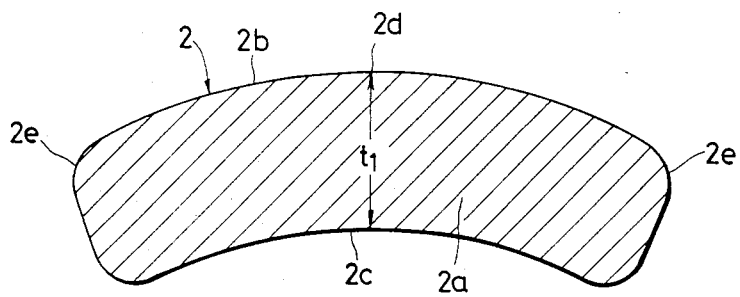
FIG. 5 is a cross-section taken along line V—V of FIG. 3.

Referring to the accompanying drawings and initially to FIGS. 2 to 5, there is shown a first embodiment of the leaf spring element to be used in the laminated leaf spring according to the present invention, in which FIG. 2 is a perspective view of the spring element, FIG. 3 is a side view thereof, FIG. 4 is a cross-section taken along line IV—IV of FIG. 3 and FIG. 5 is a cross-section taken along line V—V of FIG. 3.

In FIGS. 2 and 3, the tapered leaf spring 2 of the present invention is characterized by a thickness which is at a maximum at around the center portion thereof and which decreases continuously towards opposite ends thereof, so that the bending stress distribution is substantially uniform throughout the spring length. In cross-section, the spring has a shape which includes a convex surface 2b on which tension is applied and a concave surface 2c on which compressive stress is applied under the bending moment, so that the neutral axis in the cross-section is shifted toward the tension side thereof. The portions at which the maximum bending stress occur are outside the corner portions 2e, to avoid fatigue breakdown thereat.

With the tapered shape of the present leaf spring element, the relation between the length l defined between points B and C or between D and E of the tapered portion thereof and the difference $\Delta t$ between the maximum thickness $t_1$ of the portion between points C and D and the minimum thickness $t_2$ of portion between the points A and B or between E and F can be represented by $$0.005 \leq \Delta t/l \leq 0.15$$

and more preferably, $$0.005 \leq \Delta t/l \leq 0.03$$

That is, if $\Delta t/l$ is smaller than 0.005, the reduction rate of the weight is too small, and if it is larger than 0.15, manufacture of the leaf spring becomes difficult. If $\Delta t/l$ is selected between 0.005 and 0.15, and preferably between 0.005 and 0.03, the manufacturing cost as well as the reduction rate of the weight of the leaf spring element becomes satisfactory.

As shown in FIG. 4 the leaf spring 2 has a width b and a transverse center line having a radius of curvature $r_c$ such that $$2.0 \geq r_c/b \geq 0.64$$

to ensure higher rigidity and excellent fatigue strength per unit weight as compared with flat springs, coupled with accompanying effects such as the reduction of irregularities in flexural rigidity due to errors in the radius $r_c$ which occur during the fabrication process, as well as a reduction in weight. If $r_c/b$ is larger than 2.0, the spring constant and weight thereof come to the same level as those of the conventional rolled flat spring, and if it is smaller than 0.64, the cross-sectional secondary moment due to errors in the curvatures of the arc surfaces in forming the flat steel into an arc varies too much, lowering the possibility of obtaining an effective spring.

The plate thickness t of the above-mentioned cross-section is held in the range $$0.5 \geq t/b \geq 0.05$$

to improve the roll-forming characteristics, to enhance the surety and efficiency and to utilize the margin of the fatigue strength on the compression side. If the ratio t/b exceeds 0.5, it becomes difficult to utilize the fatigue strength to a sufficient degree, while a ratio of t/b lower than 0.05 is beyond the limit of hot working and makes the forming operation difficult. In this case, when the spring can have a center portion in which t/b is large and has a little improvement in rigidity or when the spring must have a flat center portion for mounting to a vehicle, it may be possible to make the cross-section thereof rectangular. This is also applicable where eyes are to be formed at the opposite ends of the spring.

Further, the radius of curvature $r_o$ of the arcuately convex surface 2b and the radius of curvature $r_i$ of the concave surface 2c of the leaf spring are held in the range $$1.2 \geq r_o/r_i \geq 1.0$$

so that when a plurality of the spring elements 2 are used in overlapping relation to form a composite spring 3 (FIG. 6) a gap of a predetermined width is formed between and at a median point along the width of the opposing convex and concave surfaces to prevent fretting and corrosion at the ends of the center clamp and the leaf ends of short leaf elements, ensuring improved fatigue strength. When the ratio of $r_o/r_i$ is smaller than 1.0, the center portion of the convex surface 2b contacts the concave surface 2c of an adjacent leaf element, while a value in excess of 1.2 will result in decreasing the damping effect.

Further, a leaf spring is provided with a flat surface at the center apex portion of its convex surface truncated in parallel with a line connecting opposite ends of the leaf element in the transverse cross-section, the depth of truncation h relative to the leaf thickness t being $$0.35 \geq h/t \geq 0$$

The provision of the truncated surface contributes to lowering the geometrical moment of inertia with a modulus of the section substantially similar to that of a non-truncated leaf element, that is to say, to lower the flexural rigidity alone without varying the stress or the fatigue strength, coupled with a practical advantage that surface flaws or a decarburated layer can be removed by grinding or cutting the truncated surface.

Figure 7:
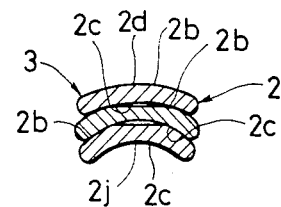
FIG. 7 is a cross-section taken along line VII—VII of FIG. 6.
Figure 6:
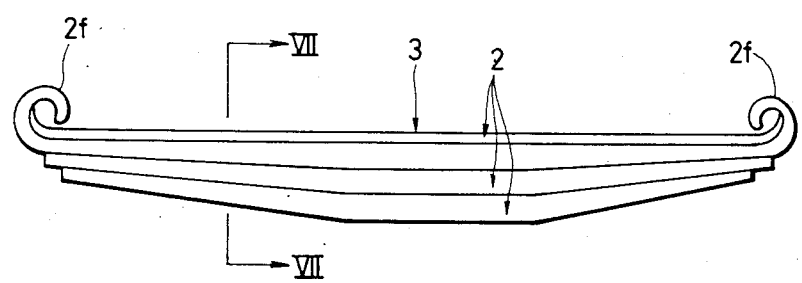
FIG. 6 is a side view of a leaf spring constituted by a plurality of the leaf spring elements shown in FIG. 3.

Further, in forming the laminated spring by overlapping a plurality of the arcuate tapered spring elements 2 and binding then together at suitable locations along the length thereof as shown in FIG. 6, the respective convex surfaces 2b are contacted with the concave surfaces 2b of the adjacent spring elements without direct contact between the apex portions 2d of the convex surfaces and the concave surfaces, leaving spaces proximate the apex portions 2d, respectively, as shown in FIG. 7, and some of the spring elements are resiliently deformed widthwisely by the binding. With this laminated structure, when a bending load is applied with the opposite ends of the spring supported by supporting members, respectively, the laminated spring 3 has excellent bending rigidity and fatigue strength per unit weight.

Figure 8:
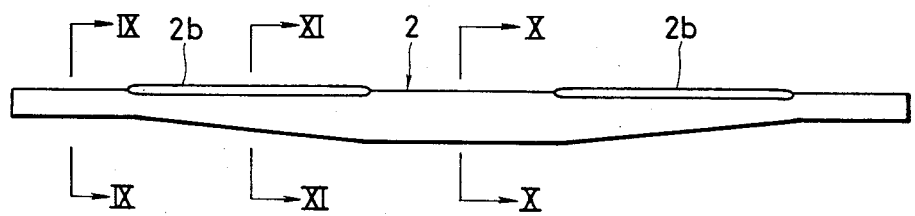
FIG. 8 is a side view of a third embodiment of the present invention.
Figure 9:
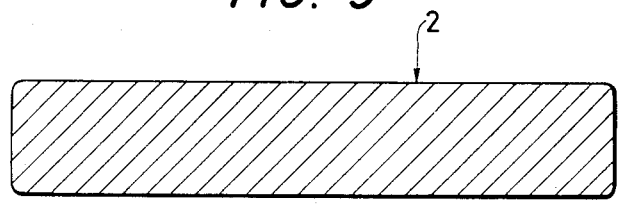
FIG. 9 is a cross-section taken along line IX—IX of FIG. 8.
Figure 10:
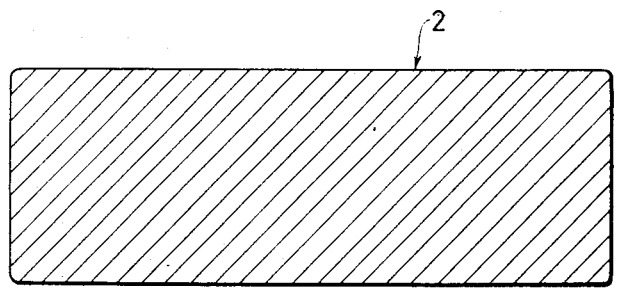
FIG. 10 is a cross-section taken along line X—X of FIG. 8.
Figure 11:
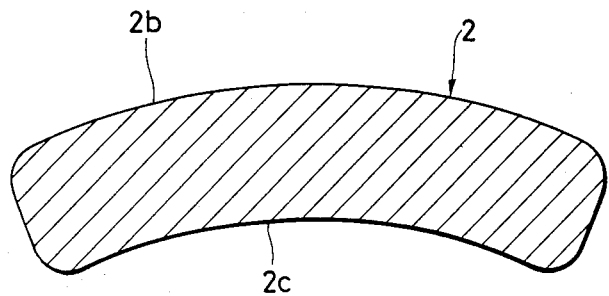
FIG. 11 is a cross-section taken along line XI—XI of FIG. 8.

FIGS. 8 to 11 show a second embodiment of the present invention, in which FIG. 8 is a side view, FIG. 9 is a cross-section taken along line IX—IX of FIG. 8, FIG. 10 in a cross-section taken along line X—X of FIG. 8 and FIG. 11 is a cross-section taken along line XI—XI of FIG. 8. In this embodiment, the cross-sectional shape of the center portion and the opposite end portions is rectangular and the shape of the remaining tapered portion is made arcuate. Although not shown, it is also possible to make the center portion and the tapered portions arcuate and the opposite end portions rectangular.

Now, the selection of the radius of curvature of the upper and lower surfaces of the arcuate cross-sectional portions will be described with reference to FIGS. 12 to 14.

Figure 12:
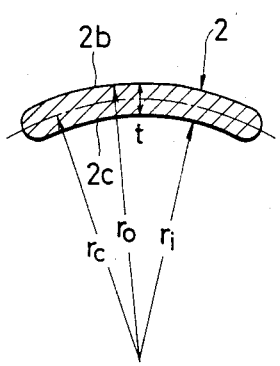
FIG. 12 illustrates a cross-sectional shape in which the convex and concave surfaces are coaxial.

The upper surface 2b and the lower surface 2c of the arcuate cross-sectional portion of the tapered spring element 2 in FIG. 12 have curvature radii $r_o$ and $r_i$, respectively, which are concentric, with the difference between $r_o$ and $r_i$ being the thickness t of the spring element.

Figure 13:
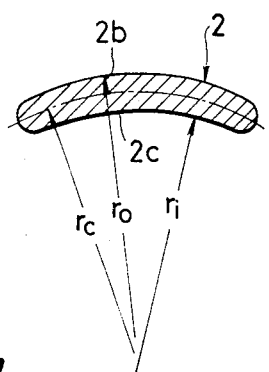
FIG. 13 illustrates a cross-sectional shape in which the surfaces have common curvature.
Figure 14:
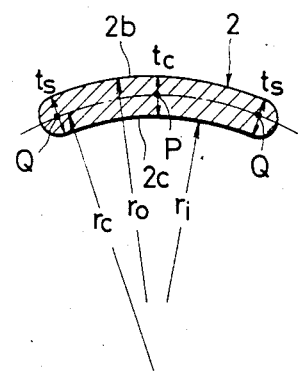
FIG. 14 illustrates a cross-sectional shape in which the surfaces have arbitrary curvatures.

In FIG. 13, the radii $r_o$ and $r_i$ of the upper and lower surfaces 2b and 2c are made equal and, in FIG. 14, $r_o$ and $r_i$ are selected arbitrarily unless there is no substantial variation in thickness throughout the cross-section.

The radius $r_c$ of the neutral plane of the spring element 2 in FIG. 12 can be calculated by subtracting half of the plate thickness t from the radius $r_o$ of the upper surface 2b. The radius $r_c$ for the case in FIG. 13 can also be calculated in a similar manner. However, as shown in FIG. 14, it may be obtained by generating a circle passing through a median point P of the thickness $t_c$ at the center portion of the tapered spring element 2, and median points Q of the thickness $t_s$ at the end portions of the element 2, and determining the radius of this circle.

The effect of the spring element thus constructed will now be described. Firstly, it is considered that whether or not tapered, an arcuate spring provides a deflection similar to that provided by a flat cantilever. According to experiments, the deflection of the arcuate element is largely coincident with the deflection amount of a cantilever calculated according to beam theory. With regard to the stress distribution under a bending moment, this is also largely coincident with the theoretically calculated value.

Figure 15:
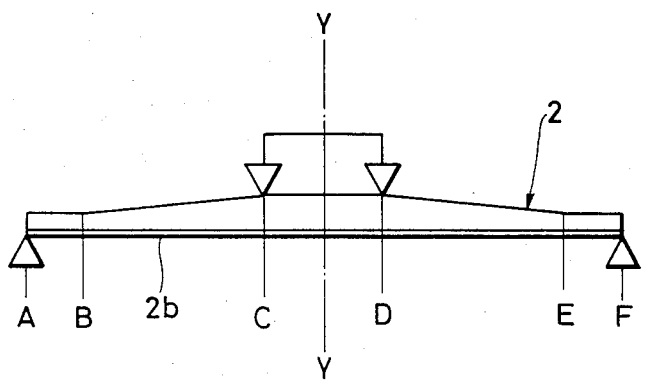
FIG. 15 is a side view showing testing conditions of the present leaf spring.

In the tapered spring element 2 shown in FIG. 15, the distances of points C, D, B, E, A and F from a center line Y arm 50 mm, 50 mm, 350 mm, 400 mm, and 400 mm, respectively. The plate thickness $t_c$ (at the median portion in cross-section) of the portion between the points C and D is a constant 10 mm, the thickness of the portion between C and B as well as between D and E varies from 10 mm to 6 mm and the thickness of the portions between B and A as well as between E and F is a constant 6 mm. The width b of the plate is 70 mm and the radius of curvature $r_c$ is 90 mm.

This spring element 2 was supported at points A and F so that tension stress acted on the convex surface 2b, and a load was applied at points C and D. The deflection at the points C and D was then measured.

Figure 16:
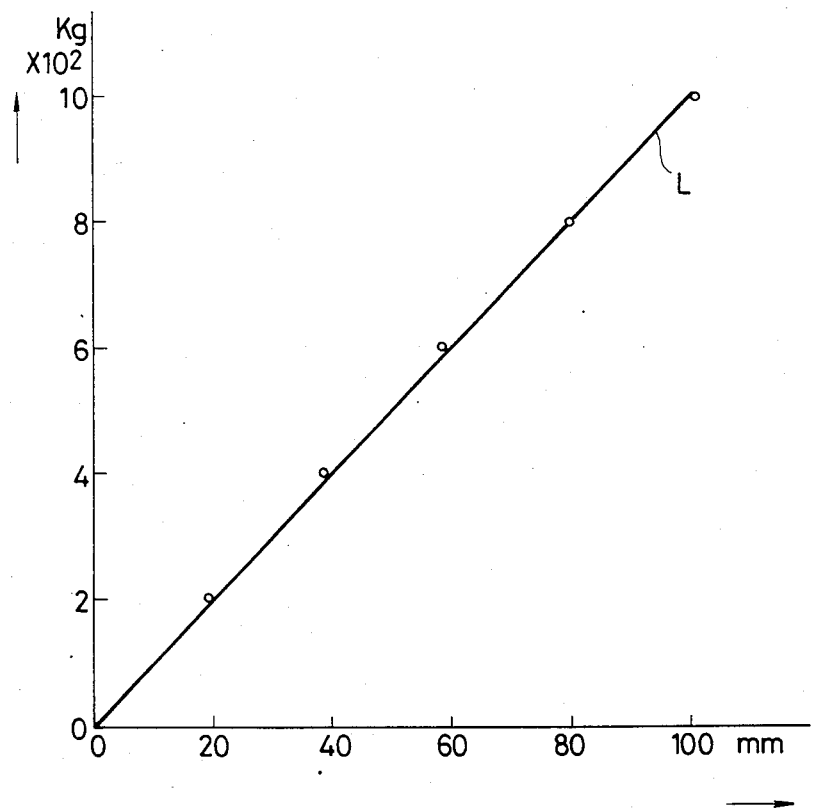
FIG. 16 is a diagram showing the deflection-load characteristics of the present leaf spring element.

FIG. 16 shows the results of this measurement. In FIG. 16, the results shown by the circles coincide well with a solid line L, which is a plot of deflection values as calculated according to beam theory.

Figure 17:
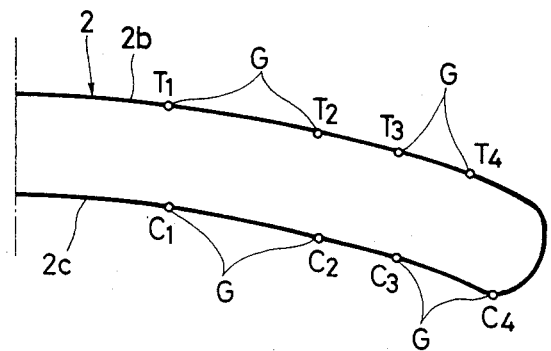
FIG. 17 shows the locations on a leaf spring element half at which gauges are mounted.
Figure 18:
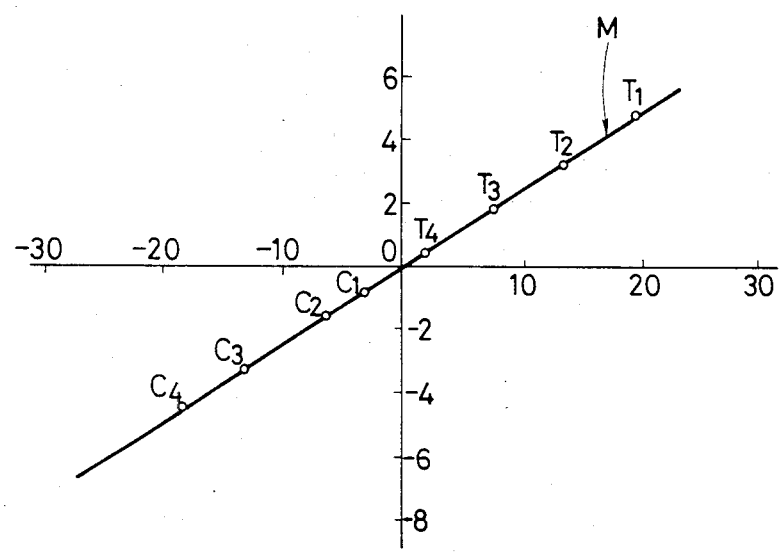
FIG. 18 is a graph showing the stress distribution in the element half of FIG. 17.

In the above measurement, strain gauges G were bonded to points $T_1$ to $T_4$ on the upper surface 2b and to points $C_1$ to $C_4$ on the lower surface 2c of the spring element 2, as shown in FIG. 17 to measure the stress at these points, which was then plotted as shown in FIG. 18. The result is coincident with a solid line M, which is a plot of the stress distribution calculated according to beam theory.

From these experiments and the results thereof, it will be clear that the tapered spring element 2 according to the present invention can be used as a resilient beam in way similar to the conventional flat spring.

For comparison purposes, the present tapered springs 2 and conventional tapered springs having a rectangular cross-section were prepared under the same conditions and tested for fatigue to determine the average endurance thereof. The tapered spring 2 used was that shown in FIG. 15, and the conventional tapered spring prepared had the same thickness distribution as that of the spring 2, the material of these springs being SUP9 as specified by the Japanese Industrial Standard.

The springs are annealed under the same conditions and then subjected to shot-peening treatment at the surfaces thereof. The hardness of the springs after heat treatment was 3.05 (BHD).

The present tapered spring 2 used in the test had concentric upper and lower surfaces 2b and 2c as shown in FIG. 12.

Figure 19:
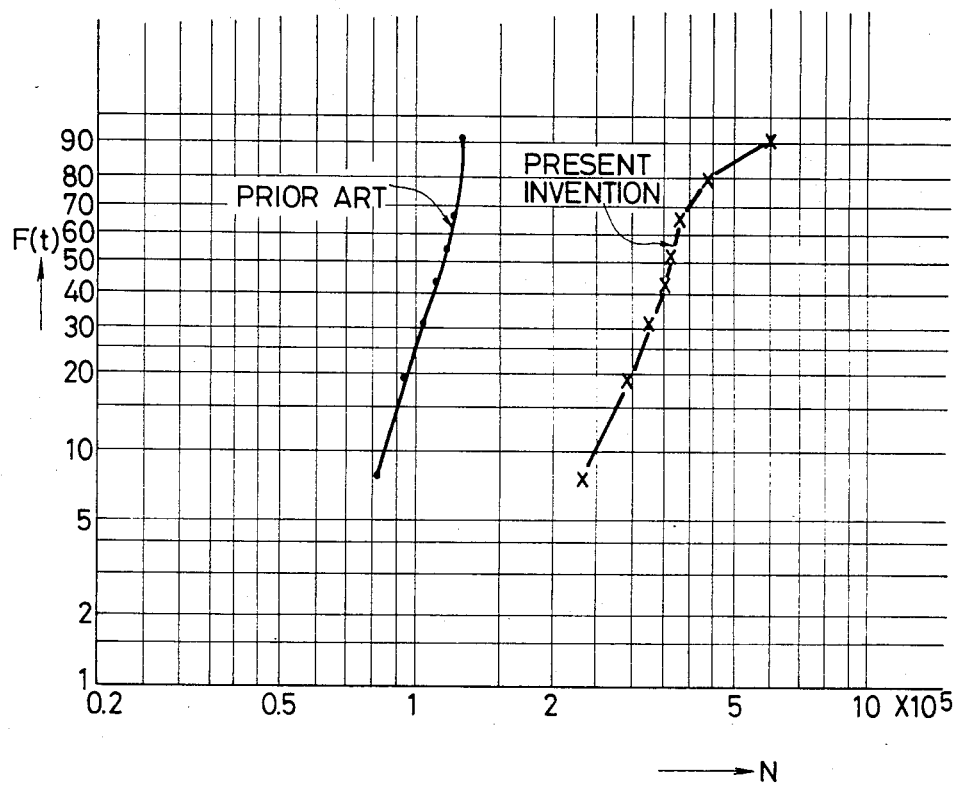
FIG. 19 is a diagram showing the endurance limit of the present leaf spring element against repeated bendings, in comparison with the conventional tapered spring.

The fatigue test was performed under the condition of an average tensile stress of 65 kg/mm² and a stress amplitude of 55 kg/mm². The results of this fatigue test, i.e., the breakdown or failure probability of the present spring 2 (shown by X's) and that of the conventional tapered spring (shown by dots) are shown in FIG. 19. From FIG. 19, it can be seen that the endurance of the present tapered spring 2 is about three times that of the conventional tapered spring in terms of the number of cycles to failure. It should be noted that in this test that the upper surface 2b of the present spring 2 was the tension stress side and a deflection was applied to that surface repeatedly.

The present tapered spring 2 has a fatigue strength similar to that of a rod spring having a circular cross-section due to that fact that the point at which the maximum tension acts is shifted to around the apex portion of the convex surface 2b on the tension side. The notch effect at the corners of the tension side where fatigue cracks formerly began to occur is removed. Further, when the peening treatment is performed at the surface of the tension side to improve the strength of the black skin decarbonized layer after heat treatment of the hot rolled spring steel material, the shot can collide at about a right angle with the convex surface 2b at which the possibility of fatigue breakdown is high, resulting in a satisfactory peening effect. The latter effect is considerable in comparison with the conventional tapered leaf spring which has corners at which the possibility of fatigue breakdown is very high, as it is hard to perform the shot peening treatment.

As to the fabrication of the present tapered leaf spring 2, by setting the width b, the thickness t, the radius of curvature $r_i$ of the concave surface 2c, the radius $r_o$ of the convex surface 2b and the radius $r_c$ of the median plane in the ranges mentioned previously, it becomes possible to minimize the variation of bending rigidity due to manufacturing errors in the radius $r_c$, and to minimize the weight, resulting in facilitated and reliable formation of the leaf spring.

Further, as to the shot peening treatment to be performed on the average tension side to strengthen the decarbonized layer of the spring, this is difficult to perform for the corners of flat leaf spring. However, it is easy to do with the present leaf spring 2 because the area which is most prone to fatigue breakdown is shifted to the apex portion 2d of the convex surface 2d, which has a large radius of curvature with which the shot can collide at about a right angle.

When the leaf spring elements 2 are used to form a laminated spring 3 as shown in FIGS. 6 and 7, a suitable gap is formed between the apex portion 2d of the convex surface 2b of one spring element 2 and the bottom portion 2j of the concave surface 2c of the adjacent spring element 2. Therefore, fretting can be prevented at portions corresponding to edge portions of the clamping member and/or edge portions of a short leaf, resulting in a considerable effect on the fatigue limit.

In addition, by providing a truncation in the apex portion 2d of the spring element 2 in the range mentioned above, a suitable space is formed between the adjacent spring elements 2 of the laminated leaf spring 3 even if the radii $r_i$ and $r_o$ of the respective elements are equal. The grinding or cutting of the apex portion in providing the truncation can remove any surface defect and the decarbonized layer of that portion, causing the fatigue strength of the spring element to be further improved.

As to weight reduction, the employment of an arcuate cross-section attributes to a reduction of about 15%, and the employment of the tapered configuration attributes to about a 5 to 10% reduction in comparison with the conventional flat leaf spring element. Therefore, it is possible to increase the usable stress per unit weight by about 20 to 30% over that of the flat leaf spring.

Further, since the ratio of the compression stress to the tension is higher than that of the flat spring by about 30%, it is possible to considerably reduce the spring weight per load, and fatigue testing performed under the same stress amplitude conditions shows that the number of cycles to failure of the present leaf spring element is three times that of the flat leaf spring element, as mentioned above.

As described hereinbefore, the present leaf spring element is characterized by a utilization of a tapered configuration and an arcuate cross-sectional shape. Therefore, it is possible to shift the median axis of bending moment toward the surface at which the maximum tension stress occurs and to shift the portion of the spring where tension stress is concentrated to a location away from the corners, as was the case with the conventional leaf springs having a rectangular cross-section, to thereby prevent damage to the leaf spring due to material defects in such corner portions. Thus, the fatigue strength of the present leaf spring is increased up to that of a spring rod having a circular cross-section, and an increase of usable stress and a reduction in the weight of the leaf spring can be attained.

When the leaf spring element according to the present invention having such advantages as mentioned hereinbefore is used in the construction of the leaf springs of a vehicle, the reliability of the vehicle is improved, and the leaf springs contribute to a reduction of the weight and consequently the fuel consumption of the vehicle.

What is claimed is:

1. A leaf spring comprising: a single spring steel plate adapted to undergo bending deformation in a direction perpendicular to the length and parallel to the thickness thereof;

a center portion of said plate in the lengthwise direction thereof having a constant maximum thickness, the thickness gradually decreasing toward opposite ends of the plate to form tapered portions;

at least said tapered portions having an arcuate shape in transverse cross-section, with a convex surface on a tension side and a concave surface on a compression side thereof, said convex and concave surfaces being defined by an arc of substantially the same radius over the entire width thereof, respectively, and said arcuate shape satisfying the relation:

$$2.0 \geq r_c/b \geq 0.64$$

where b is the width of said plate and $r_c$ is the radius of a transverse center line of said plate; and
said tapered portions satisfying the relation:

$$0.03 \geq \Delta t/l \geq 0.005,$$

where l is the length of each said tapered portion and Δt is a difference in thickness between opposite ends of each said tapered portion;

thereby providing a single tapered spring with a reduced weight as well as both flexural rigidity and fatigue strength improved per unit weight of the leaf spring.

2. The leaf spring according to claim 1, wherein said plate has, in said cross-section, a thickness t such that $$0.5 \geq t/b \geq 0.05.$$

3. The leaf spring according to claim 2, wherein said convex surface has a radius of curvature $r_o$ and said concave surface has a radius of curvature $r_i$ and a relationship between $r_o$ and $r_i$ satisfies:

$$1.2 \geq r_o/r_i \geq 1.0.$$

4. The leaf spring according to claim 3, wherein said convex surface on said tension side has an apex portion, said apex portion being truncated to form a planar surface portion parallel to a line connecting opposite ends of said steel plate, the depth of truncation h relative to the plate thickness t being such that $$0.35 \geq h/t.$$

5. The leaf spring according to claim 1, wherein said center portion and said opposite ends have a rectangular cross-section and said tapered portions have said arcuate cross-section.

6. The leaf spring according to claim 1, wherein at least the tension side of said plate is subjected to peening to increase the strength thereof.

7. A laminated leaf spring comprising:
a plurality of steel plates, each being adapted to undergo bending deformation in a direction perpendicular to the length thereof and parallel to the thickness thereof;
a center portion of each of said plates in the lengthwise direction having a constant, maximum thickness, the thickness gradually decreasing toward opposite ends of the plate to form tapered portions;
at least said tapered portions having an arcuate shape in transverse cross-section, with a convex surface on a tension side and a concave surface on a compression side thereof, said convex and concave surfaces being defined by an arc of substantially the same radius over the entire width thereof, respectively, and said arcuate shape satisfying the relation:

$$2.0 \geq r_c/b \geq 0.64$$

where b is the width of said plate and $r_c$ is the radius of a transverse center line of said plate; and
said tapered portions satisfying the relation:

$$0.03 \geq \Delta t/l \geq 0.005,$$

where l is the length of each said tapered portion and Δt is a difference in thickness between opposite ends of each said tapered portion:

thereby providing a laminated leaf spring with a reduced weight as well as both flexural rigidity and fatigue strength improved per unit weight of the leaf spring.

8. The laminated leaf spring according to claim 7, wherein each said plate has, in said cross-section, a thickness t such that:

$$0.5 \geq t/b \geq 0.05.$$

9. The laminated leaf spring according to claim 8, wherein said convex surface has a radius of curvature $r_o$ and said concave surface has a radius of curvature $r_i$ and a relationship between $r_o$ and $r_i$ satisfies:

$$1.2 \geq r_o/r_i \geq 1.0.$$

10. The laminated leaf spring according to claim 9, wherein said convex surface on said tension side has an apex portion, said apex portion being truncated to form a planar surface portion parallel with a line connecting opposite ends of said steel plate, the depth of truncation h relative to the plate thickness t being such that:

$$0.35 \geq h/t.$$

11. The laminated leaf spring according to claim 7, wherein each said center portion and said opposite ends have a rectangular cross-section, and said tapered portions have said arcuate cross-section.

12. The laminated leaf spring according to claim 7, wherein each of said plates have a curvature such that, when laminated, a gap is formed between the apex of a convex surface of one plate and the concave surface of an adjacent plate.

13. The laminated leaf spring according to claim 7, wherein at least the tension sides of said plates are subjected to peening to increase the strength thereof.

* * * * *